(12) United States Patent
Alvarado

(10) Patent No.: US 12,039,110 B1
(45) Date of Patent: Jul. 16, 2024

(54) UNIVERSAL METHOD OF WRITING USING A MULTIPURPOSE KEYPAD

(71) Applicant: Alfredo Alvarado, Bogota D.C. (CO)

(72) Inventor: Alfredo Alvarado, Bogota D.C. (CO)

( * ) Notice: Subject to any disclaimer, the term of this patent is extended or adjusted under 35 U.S.C. 154(b) by 0 days.

(21) Appl. No.: 18/423,892

(22) Filed: Jan. 26, 2024

(51) Int. Cl.
*G06F 3/023* (2006.01)
*G06F 3/02* (2006.01)
*G09B 21/00* (2006.01)

(52) U.S. Cl.
CPC .......... *G06F 3/0238* (2013.01); *G06F 3/0219* (2013.01); *G09B 21/002* (2013.01)

(58) Field of Classification Search
CPC .... G06F 3/0238; G06F 3/0219; G09B 21/002
See application file for complete search history.

(56) References Cited

U.S. PATENT DOCUMENTS

| | | | |
|---|---|---|---|
| 8,174,409 B2 | 5/2012 | Alvarado | |
| 2009/0073002 A1* | 3/2009 | Alvarado | G06F 3/04886 341/22 |
| 2022/0360657 A1* | 11/2022 | Ghassabian | G06F 3/167 |

OTHER PUBLICATIONS

A new Method of Writing and Reading for the Visually impaired, published by International Journal of Progressive Sciences and Technologies (IJPSAT), vol. 32 No. Apr. 1, 2022 pp. 350-376 (Alfredo Alvarado).

* cited by examiner

*Primary Examiner* — Afroza Chowdhury
(74) *Attorney, Agent, or Firm* — Mark D. Bowen, Esq.; Malin Haley DiMaggio & Bowen, P.A.

(57) ABSTRACT

A method of writing using a multipurpose keypad that includes alphabetic letters, glyphs, numbers, punctuation marks, typographical symbols, and mathematical symbols. The keypad can be activated by making short traces with a fingertip instead of taping on a touch sensitive screen. The keypad can simultaneously use alphabets of different languages including the alphabets for the blind and visually impaired people. The method of writing enables speeds up the writing process by using a combination of traces to represent syllables or short words in different languages, something like shorthand writing. The method allows the practical use of more than 170 mathematical symbols. Finally, the method can be used in literary work, mathematics, science computer software and other varieties of written materials.

6 Claims, 30 Drawing Sheets

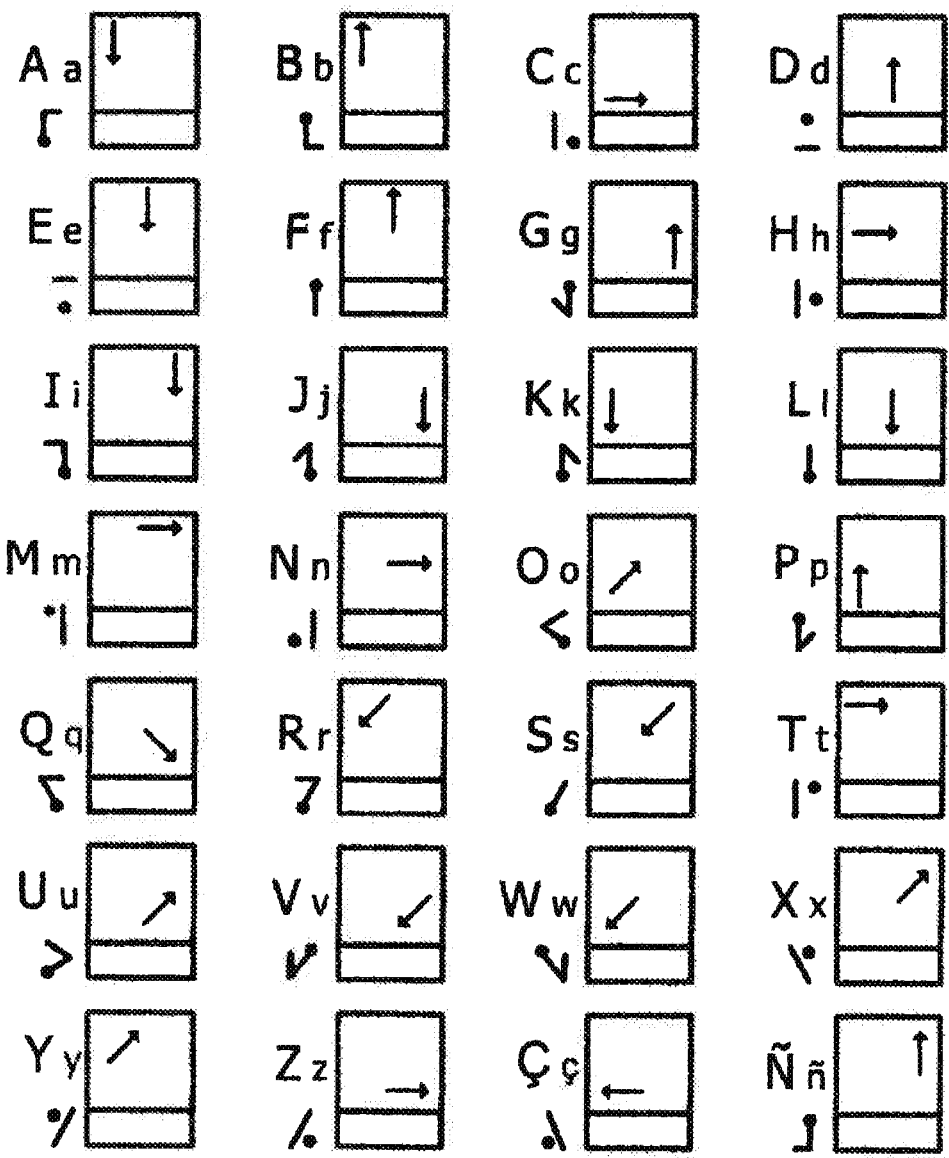
Fig. 1  Latin Alphabet

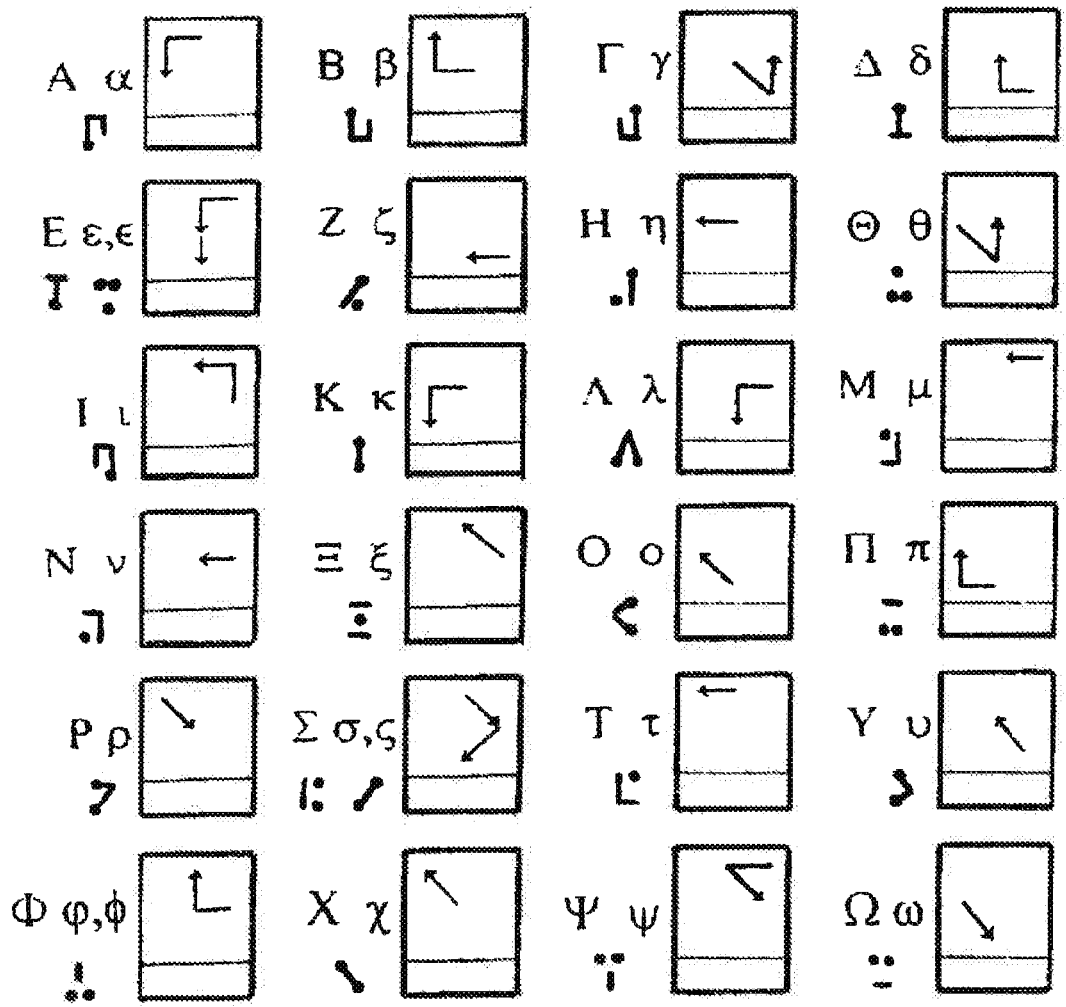
Fig. 2  Mathematic Greek Alphabet

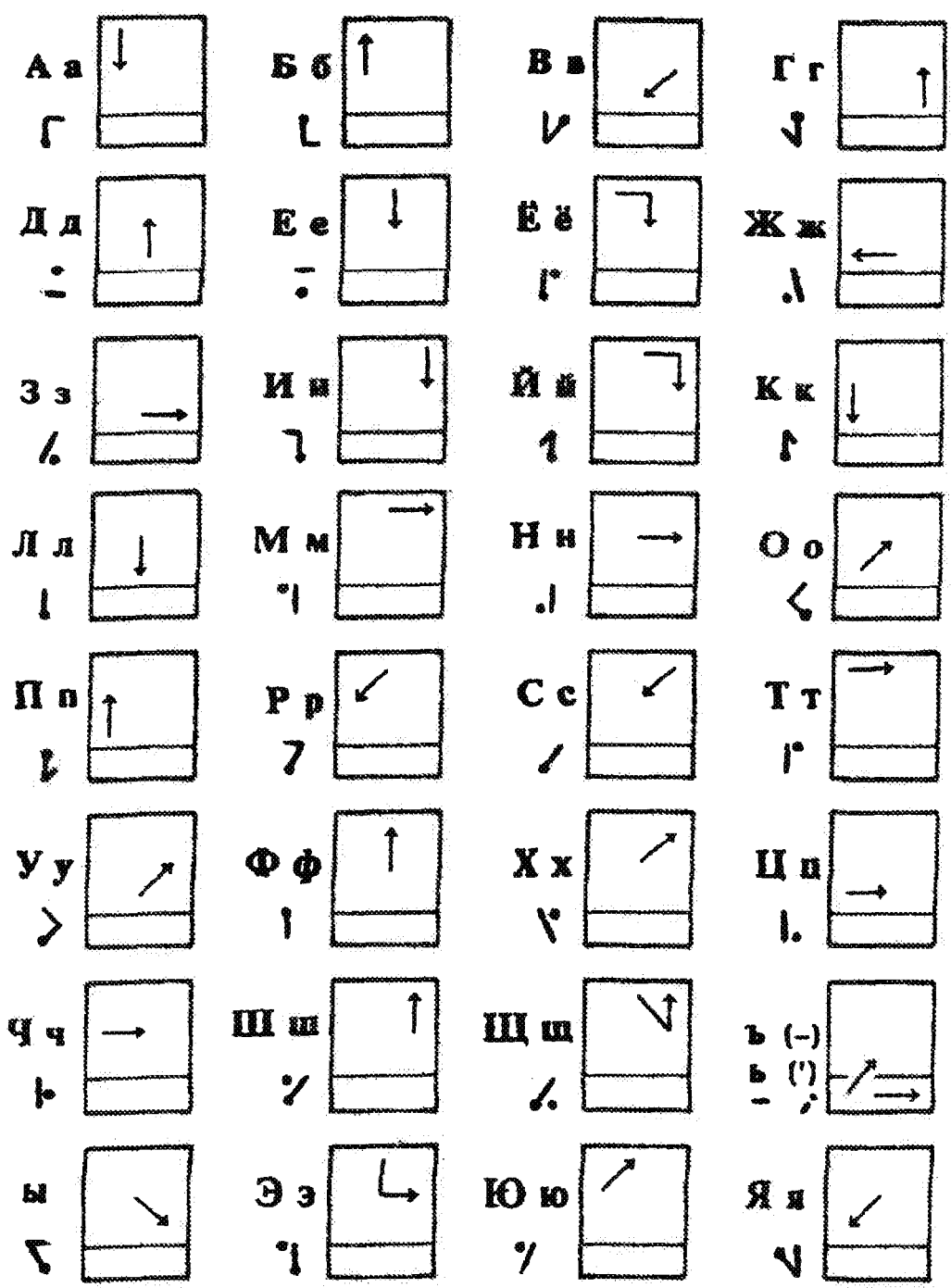
Fig. 3 Russian Alphabet

Fig. 4  Old German Alphabet  cm Scale: 
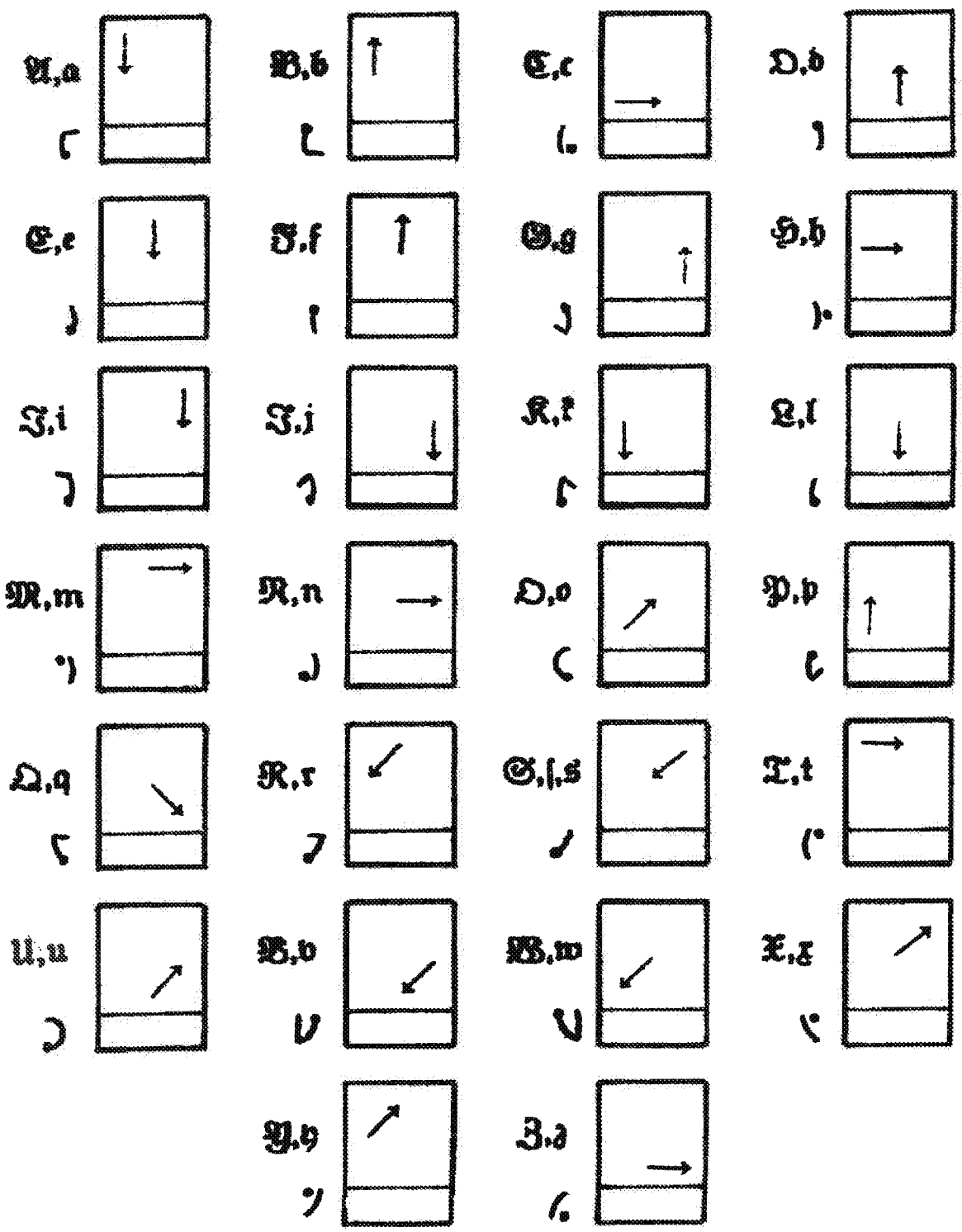

Fig. 5 Turkish Alphabet
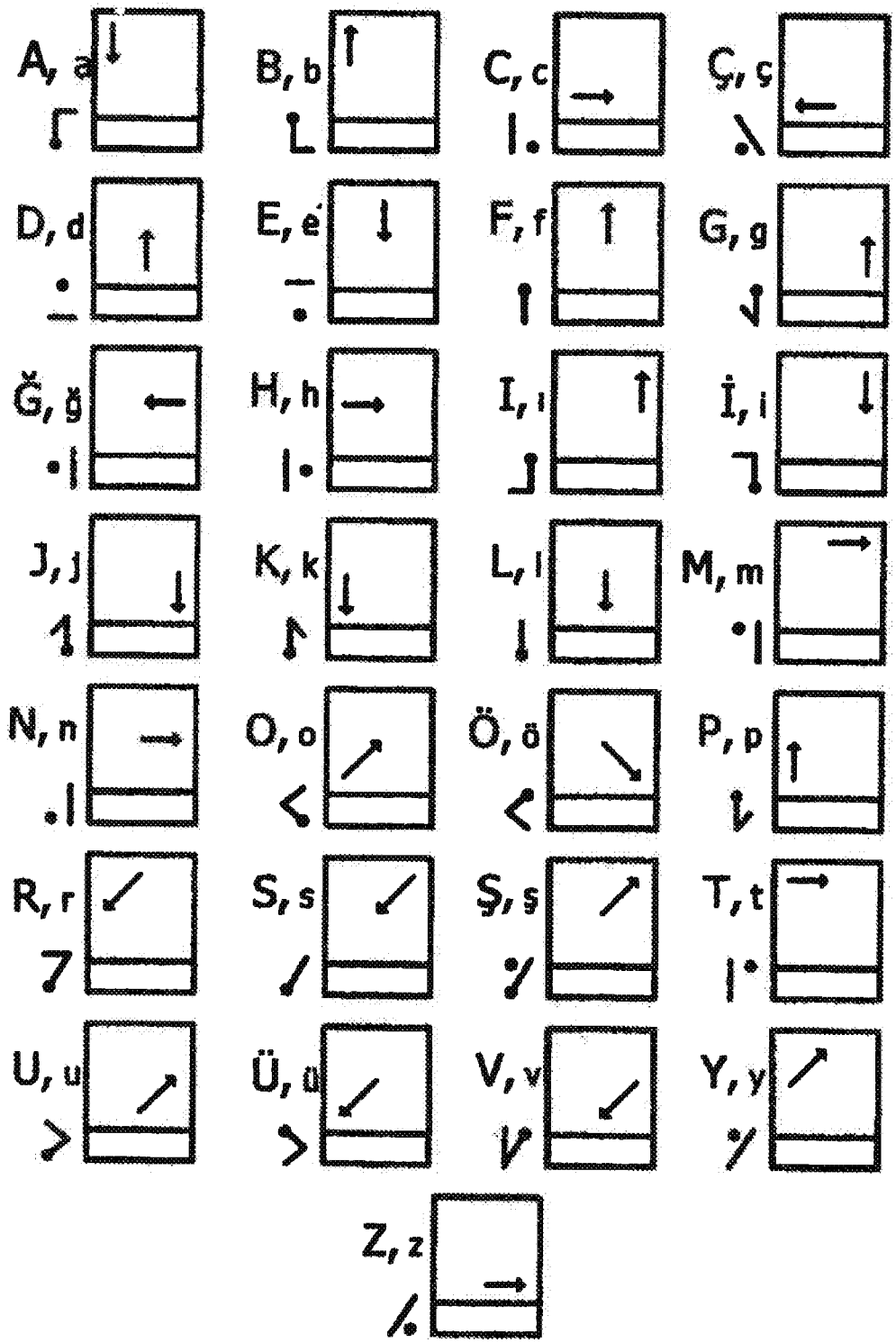

Fig. 6 Punctuation Marks

Fig. 7 Typographic Symbols

Fig. 8      Basic Characters
Alphabet

Fig. 9A  *Italic Font Alphabet* cm Scale:

ɼ ℓ ɭ. ⁻ ⁻ ʃ ⱱ ɭ·ʔ ʔ ɾ ɭ ᵎ ɹ
a b c d e f g h i j k l m n

< ɭ ɾ ʔ ⁄ ɾ· > V V ɣ ⁄ ⸰ɭ ɹ
o p q r s t u v w x y z c ñ

Fig. 9B  Bold Font Alphabet

ɼ ℓ ɭ. ⁻ ⁻ ʃ ⱱ ɭ·ʔ ʔ ɾ ɭ ᵎ ɹ
a b c d e f g h i j k l m n

< ɭ ɾ ʔ ⁄ ɾ· > V V ɣ ⁄ ⸰ɭ ɹ
o p q r s t u v w x y z c ñ

Fig. 10A — Binary Operation Symbols

Fig. 10B  Binary Operation Symbols

Fig 11A  Binary Relation Symbols

Fig. 11B  Binary Relation Symbols

Fig. 11C  Binary Relation Symbols
  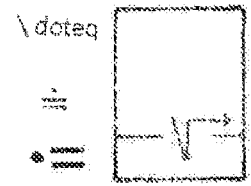 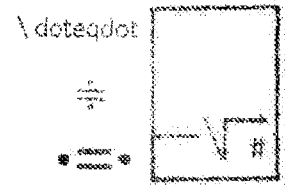
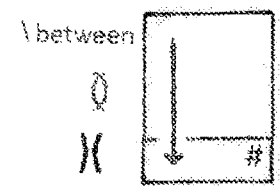  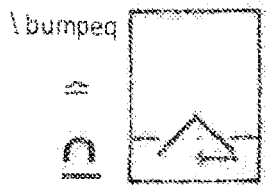 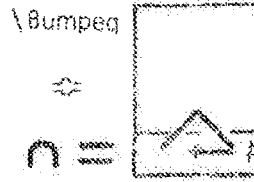
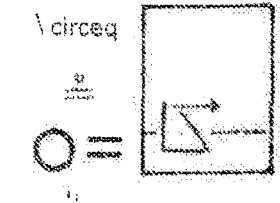 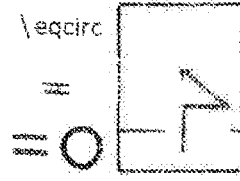  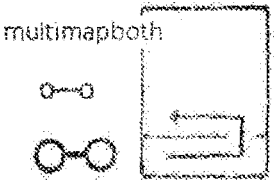
 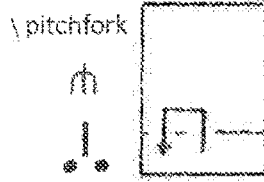 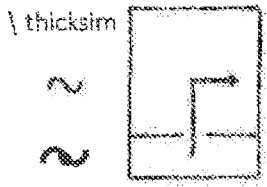 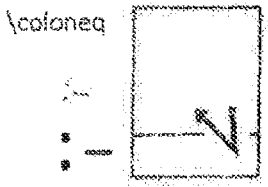
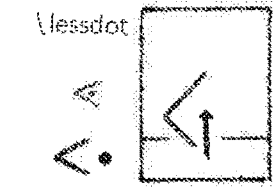 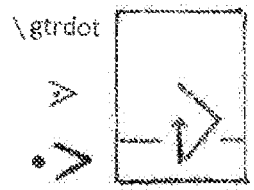 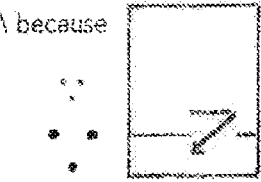 
 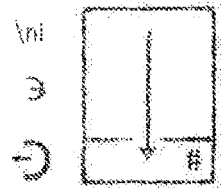

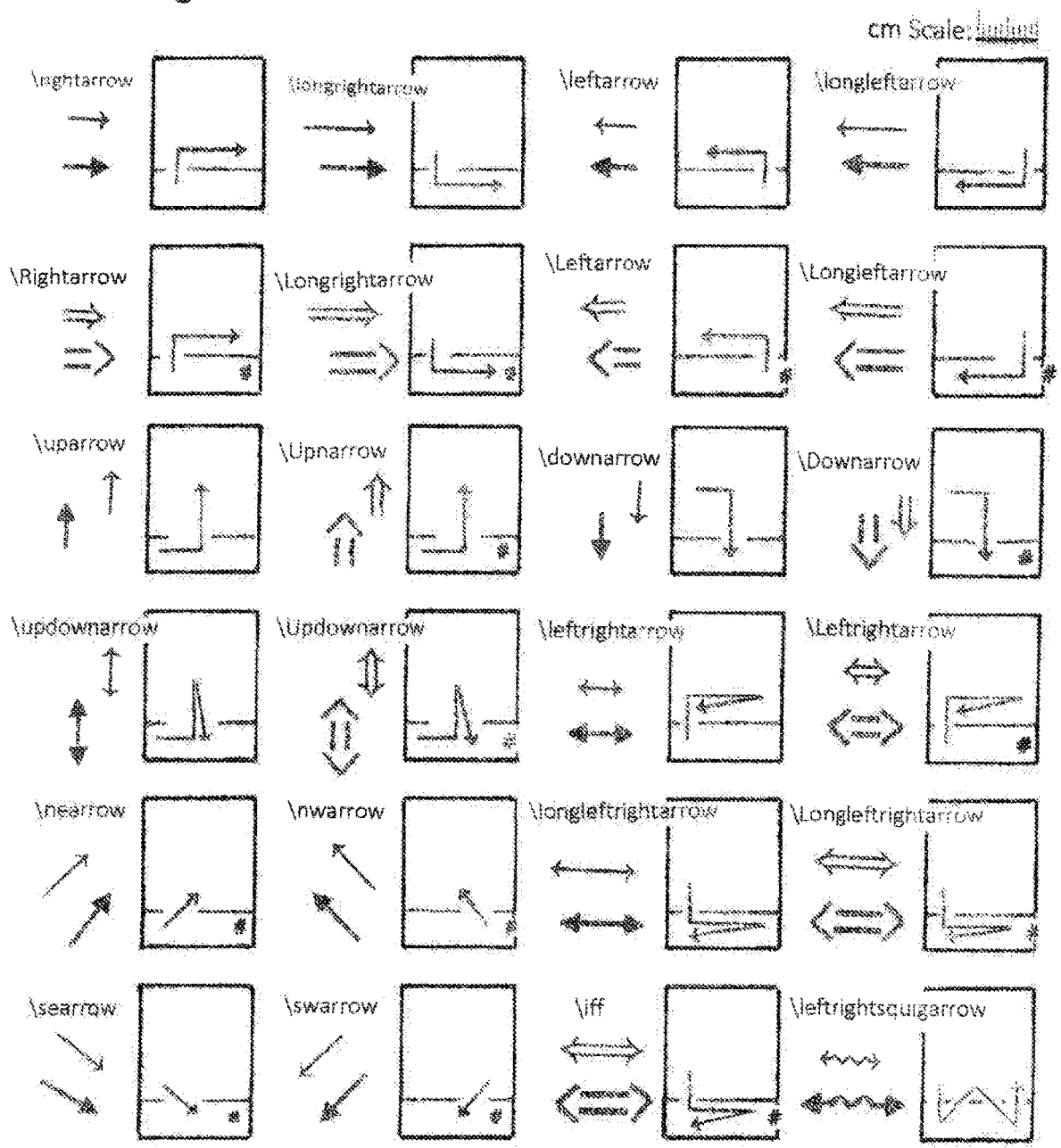
Fig. 12A Arrow Symbols

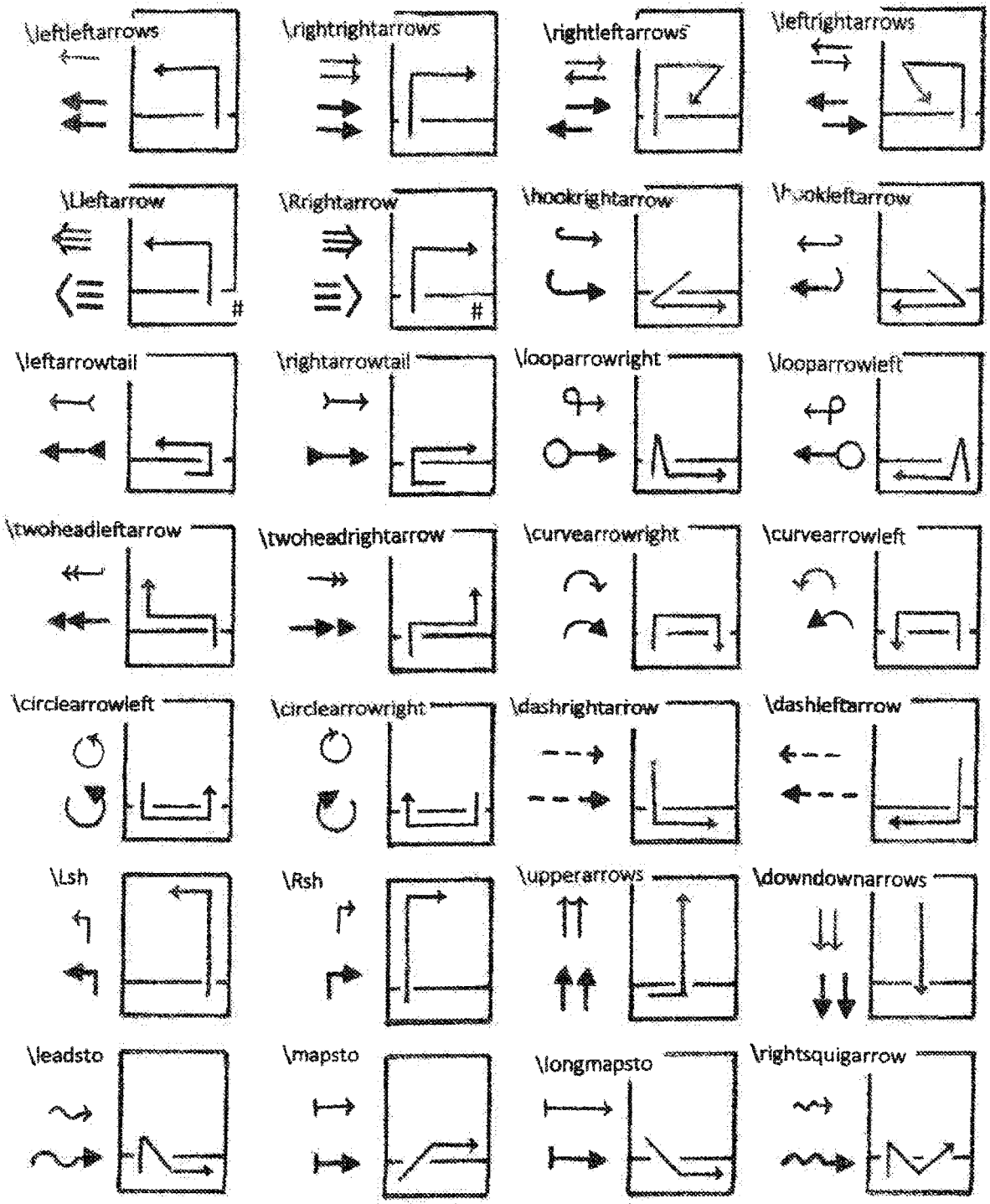
Fig. 12B — Arrow Symbols

Fig. 13A  Miscellaneous Symbols

Fig. 13B  Miscellaneous Symbols  cm scale 

Fig. 14 Delimiters Symbols

Fig. 15 — Big Size Symbols

Fig. 17    Combination of Two Letters
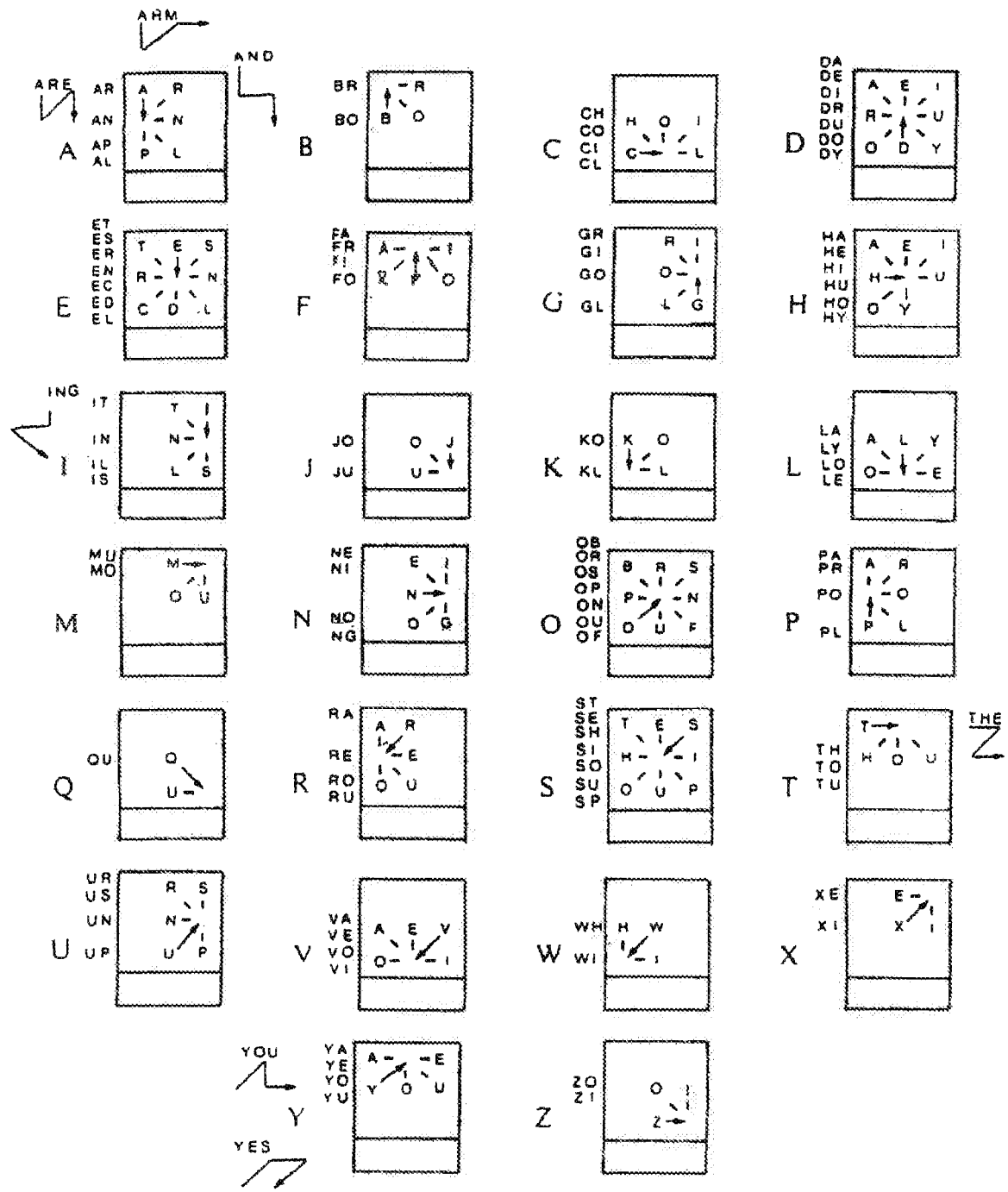

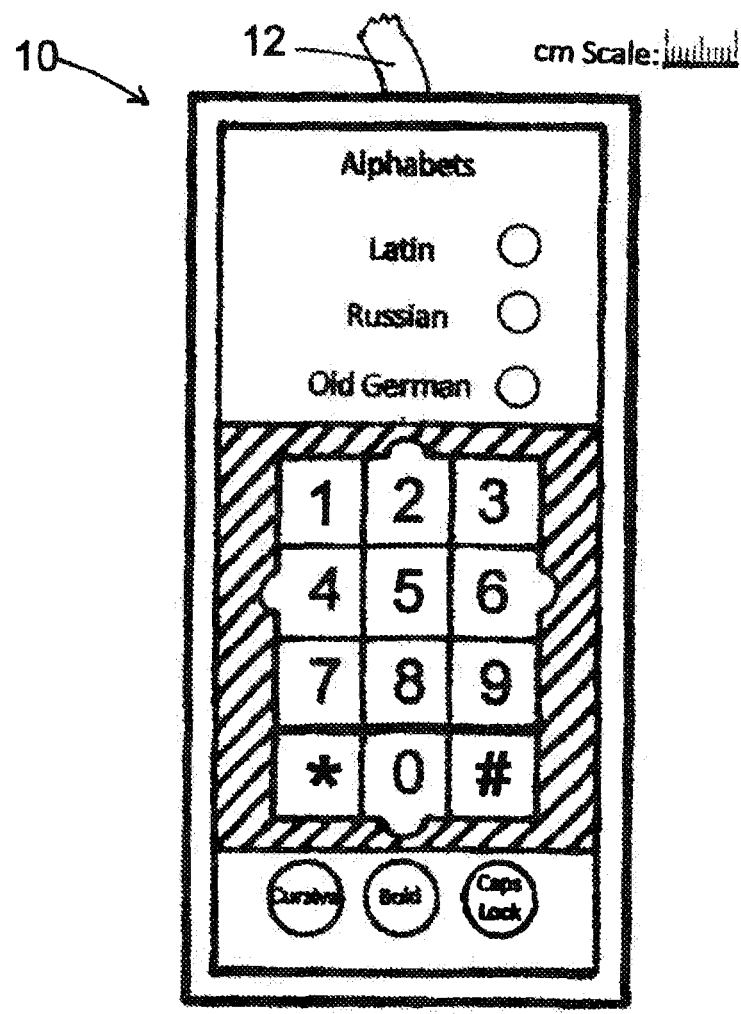
Fig. 18A Keypad for people with normal vision

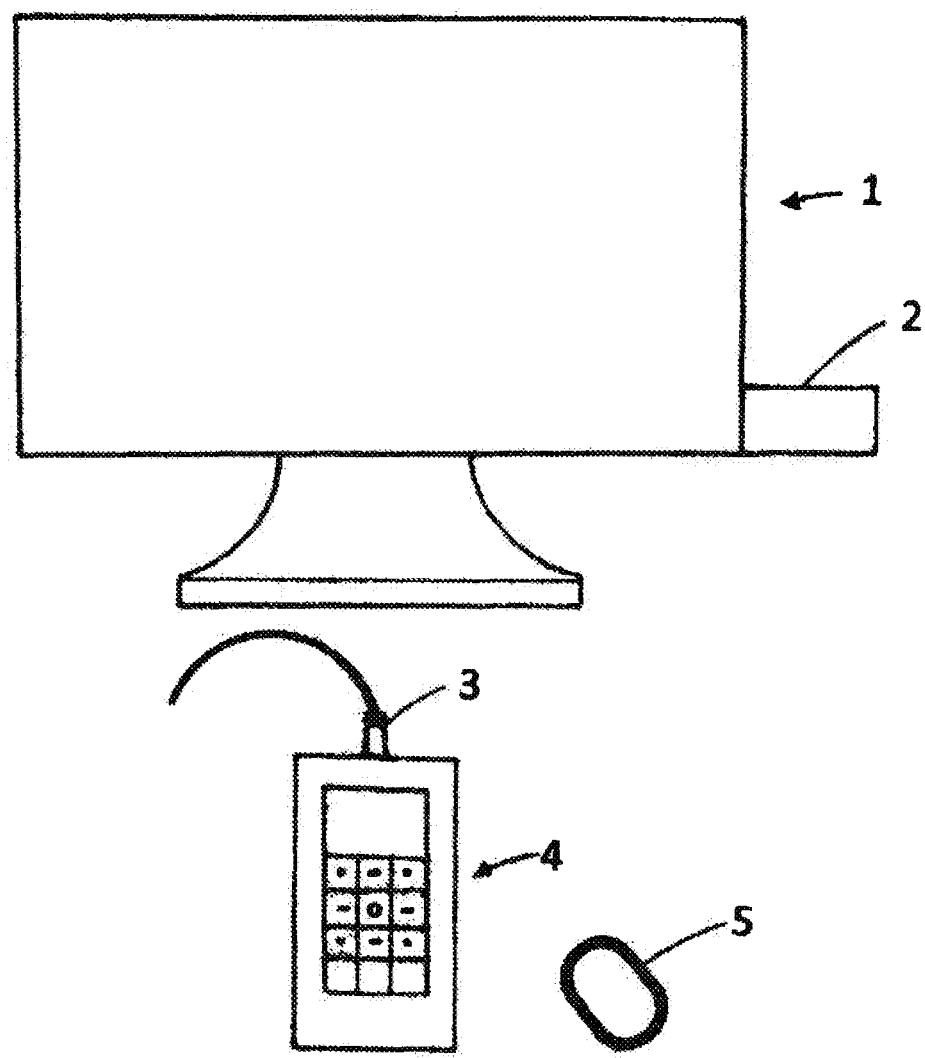
Fig. 19 General arrangement of the multipurpose keypad

Fig. 20

COMBINATION OF THREE LETTERS

English: ALL 1485 AND 1458 ANT 1451 ANY 1453 ARE 1425 ARN 1423

ASH 1454 ATE 1415

BAN 4145 BAR 4142 BRA 4121 BEG 4159 BEN 4125 BON 4156 BUT 4152

CAN 7845 CAR 7842 CEL 7858 CIE 7876 COM 7853 CON 7856 COP 7854 COR 7852

COT 7851 COW 7857

DAD 8545 DAT 8512 DAY 8514 DEL 8525 DES 8523 DET 8521 DIA 8532 DIS 8512

DUE 8585 DRU 8526 DUR 8562

EAT 2512 EGG 2596 EMA 2521 EMO 2525 END 2568 ENO 2565 ENT 2562 ERA 2541

FAT 5212 FIN 5235 FEM 5253 FUE 5265 FEW 5257 FOR 5252

GEL 9658 GET 9651

HAT 4512 HAY 4514 HER 4524 HIM 4532 HIS 4535 HOW 4575

ING 3659 ITS 3623 KEY 4753 LAB 5841 MET 2321 MIS 2363 NEW 5625 NET 5621

NON 5656 NOT 5652

OIL 7568 ONE 7565 OUR 7562 9

PAN 7415 PON 7456 PRO 7425

QUE 5985 QUI 5986

RED 2425 ROD 2458 RON 2456 ROW 2457

SAL 3515 SEE 3525 SHE 3542 SIN 3536 SON 3565

TAN 1215 TEA 1251 TEL 1258 TEN 1256 THE 1245 TRE 1242 TWO 1257

USE 8652 VEN 6856 VET 6851

WAT 5741 WAY 5742 WET 5752 WHO 5745 WON 5756

YES 4235 YOU 4256 YET 4251

Fig. 21

COMBINATION OF THREE LETERS

Spanish: ARE 1425  BAR 4142  BOM 7853  CON 7856  DEL 8525  DAD 8545
DAR 8542  DES 8523  DIA 8532  DIO 8565  DIS 8535  ESO 2535  ESE 2532
IDO 3657  LUZ 5869  MES 2353  MIO 2365  NEO 5624  NON 5656  NOS 5653  OIS 7563
OSO 7535  PAN 7415  PON 7456  POR 7452  QUE 5985  QUI 3586  SAL 3545  SON 3565
SUS 3563  TAN 1215  TEL 1258  TOS 1253  TUS 1265  UNA 8654  USE 8652  UNA 8654
VER 6854  VEN 6856  VEO 6857  VEZ 6859.

German: ANT 1451  ANZ 1459  AST 1452  BEI 4123  DER 8524  ENT 2562  ENZ 2568
ICH 3654  IER 3654  IHR 3652  IST 3632  HAB 4514  HAT  ROT 2452  SIS 3535  TEL 1258
TUM 1262  UNG 8659  WER 5752  ZER 8952.

French: BON 4156  CEL 7858  DES 8523  DUR 8562  DRU 8526  MOI 2353  NEI 5323
OUI 7586  PEU 7458  RAS 2415.

Italian: DEL 8525  GLI 9653  LUI 5863  NON 5656  TRE 1242  SEI 3523  UNA 8654
UNO 8657.

Portuguese: ATE 1415  BEM 4123  BOA 4151  COR  DIS 8535  ENO 2565  EMA 2521
ESE 2532  IDA 3651  LER 585  MES 2353  MEU 2358  NOS 5653  SEI 3523  SER 3624
SEU 3526  SIM 3535  TAO 1247  VIR 6862  TER 1252  VER 6854  VEZ VIR 6862.

Polish: CIE 7862  CZY 7895  ILE 3652  NIE 5632  NOK 5654  PAN 7415  SOK 3547
TAK 1214  TEN 1256  TOR 1252  ZIE 8962.

Fig. 22

COMBINATION OF THREE LETTERS

Turkish: BAN 4145 BEG 4159 BEY 41249 GEL 9658 GIT 9632 GOZ 9659 KOY 4752 ODA 7584 PUL 7485.

Hungarian: EGY 2562 FEY 5259 FIU 5236 FOG 5268 FUI 526 HAL 4515 HET 4521 HOL 4578 KED 4758 KEZ 4759 LAB 5841 NEI 5626 ORR 7524 REZ 2459 SEG 2569 SEG 3526 SOR 3574 TEI 1259 TIO 1235 VER 6852.

Finnish: APA 1474 BEN 4126 ENO 2565 ETU 2526 HEI 4523 JNE 6965 JOS 6953 KOK 4754 KUN 4786 OMA 4521 OTE 7512 SEN 3526 TIE 1235 ULF 8685.

Swedish: BET 4151 BOK 4154 BRA 4121 DAR DET 8521 DIG 8526 FAT 5212 FEM 5253 GOR 9652 HAR 4542 HET 4521 HUR 4584 KOM 4752 MED 2358 OCH 7574 OST 7532 RED 2425 ROT 2451 SEX 3523 SJU 3568 SOV 3578 TEA 1251 TEG 1259 TIO 1235 VET 6851 .

Russian: БОБ 4154 БОИ 4153 БЕК 4124 ДЕД 8525 ДЕН 8525 ДЛА 8585 ДУХ 8565 ЕТО 2515 ГОД 9658 ГДЕ 9685 ИЛИ 3653 КАК 4747 КОИ 4753 КОМ 4752 ЛОБ 5854 МИР 2362 МОИ 2353 МОЛ 2358 НЕТ 5621 NOS 6553 ОБА 7541 ПОД 2458 ПОЛ 7458 PRO 7425 РАЕ 2412 ROD 2458 РОТ 2451 САМ 3542 СУД 3585 ТАК 1214 ТАТ 1212 ТУТ 1262 УЗЕ 8685.

Fig. 23A

COMBINATION OF THREE LETTERS

Esperanto: AER 1424 AKN 1475 ALD 1478 ALE 1485 ALK 1454 ALN 1486 ANT 1451 ARB 1424 ARE 1425 ARM 1423 BAK 4147 BAL 4148 BAN 4145 BAR 4142 BAT 4141 BEB 4124 BEK 4157 BEL 4158 BER 4124 BET 4151 BON 4156 BOR 4154 BOT 4151 BRU 4125 CAR 7842 CIC 7868 CIM 7863 COL 7875 DAT 8541 DEK 8524 DES 8523 DIR 8532 DIS 8563 DOK 8574 DOZ 8578 DUM 8563 EBL 2545 EDZ 2589 END 2568 ENT 2515 5242 DUM 8563 EBL 2545 EDZ 2589 END 2568 ETN 2515 FAR 5242 FEK 5254 FOR 5252 FOT 5251 FUG 5259 FUM 5263 GEM 9623 GEN 9625 GLU 9685 GRI 9623 GRU 9626 GUF 9686 HAK 4547 HAL 4548 HOK 4574 HUK 4565 HUZ 4589 IDE 3652 IEL 3658 ILI 3653 IND 3658 ENG 2569 IST 3632 JES 6953 JOD 6958 JUD 6985 JUG 6989 JUK 6984 JUN 6965 JUP 6987 JUR 6984 KAF 4745 KAY 4742 KAL 4748 KAN 4745 KAP 4747 KAR 4742 KAT 4741 KEL 4758 KEN 4756 KEP 4757 KOD 4758 KOK 4757 KOM 4752 KON 4756 KOT 4751 KRE 4742 KUB 4784 KUK 4787 KUL 4785 KUN 4786 KUZ 4789 LAC 5847 LAD 5848 LAF 5842 LAN 5845 LAT 5842 LIG 5869 LIR 5862 LOB 5854 LOD 5878 LOG 5859 LOK 5874 LOL 5875 LUD 5858 LUM 5863 LUN 5865 MEL 2325 MEM 2323 MES 2325.

Fig. 23B

COMBINATION OF THREE LTTERS

Esperanto: MET 2321 MEV 2326 MAZ 2359 MIL 2368 MIR 2363 MIS 2363 MOK 2354 MOL 2358 MON 2356 MOR 2352 MUF 2362 NET 5621 NOM 5652 MOV 5658 NUB 5684 NUD 5685 NUK5687 NUN 5686 OBE 7542 OBL 7545 ONI 7563 ORD 7548 ORT 7541 OST 7532 PAF 7412 PAK 7414 PAN 7415 PEK 7457 PEG 7459 PEL 7458 PEP 7454 PER 7424 PET7421 PLI 7453 PLU 7458 POL 7475 POM 7453 POR 7452 POT 7451 PRI 7423 PUB 7484 PUF 7484 PUN 7486 PUP 7487 RAB 2414 RAT 2412 REG 2459 SEM 2423 RET 2421 REV 2426 ROK 2474 ROL 2475 ROS 2453 ROT 2451 ROZ 24478 RUB 2484 RUL 2485 RUZ 2489 SAL 3515 SAN 3545 SAP 3547 SAT 3512 SES 3523 SID 3568 SIN 3565 SKU3548 SOF 3575 SOL 3578 SUB 3584 SUD 3568 SUK 3587 SUM 3563 TAN 1215 TEM 1252 TEN 1256 TER 1254 TIE 1232 TIF 1235 TIG 1236 TIO 1235 TIU 1268 TOG 1259 TRA 1241 TRO 1247 TRU 1248 TUF 1262 TUJ 1269 TUL 1268 TUS 1265 ULN 8656 UNI 8653 UNU 8658 URB 8624 URN 8625 URS 8623 VEK 6854 VEL 6856 VEN 6856 VET 6851 VID 6868 VIN 6865 VIR 6862 VIZ 6869 VOJ 6859 VOL 6858 VWK 6857 ZON 8956 ZUM 8962.

UNIVERSAL METHOD OF WRITING USING A MULTIPURPOSE KEYPAD

CROSSREFERENCE TO RELATED APPLICATIONS

N/A

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file of records, but otherwise reserves all rights whatsoever.

BACKGROUND OF THE INVENTION

1. Field of the Invention

The present invention relates to a universal method of writing using a multipurpose keypad that includes alphabetic characters, numerals, punctuation marks, typographical and mathematical symbols. In addition, the same keypad can be adapted to display the alphabetic characters in different languages such as the European and oriental languages. Accordingly, it is the main object of the invention to provide a universal method that can be used in literary work, mathematics, science computer software and other varieties of written materials.

BRIEF SUMMARY OF THE INVENTION

The present invention is an advancement of the writing method described in the Lineographic alphanumeric system disclosed in the U.S. Pat. No. 8,174,409 (the disclosure of which is incorporated herein by reference) and is aimed to speed up the writing process by using a combination of letters in various foreign languages. Accordingly, it is the main object of the invention to provide a universal method that can be used in literary work, mathematics, science, computer software, and other variety of written materials. It is also the object of the present invention to provide a multipurpose keypad that can be activated by making short traces with the fingertip without requiring any taping, except for the numbers, on a touch sensitive screen. It is a further object of the invention to provide a universal method of writing that uses short traces on a touch sensitive screen to represent letters, punctuation marks, typographic symbols, and a variety of mathematical symbols. It is a further object of the invention to provide a keypad that can process the traces of the Lineographic system mentioned above. It is a further object of the invention to provide a keypad that can use simultaneously alphabets of different languages. It is a further object of the invention to provide a keypad able to use the alphabet for the blind and visually impaired and accordingly to my book entitled "A new Method of Writing and Reading for the Visually impaired" and published by International Journal of Progressive Sciences and Technologies (LIPSAT), Vol 32 No. 1 Apr. 2022 pp 350-376. It is a further object of the invention to provide a method of writing to represent cardinal and ordinal numbers by tapping with a fingertip on the corresponding numbers. It is a further object of the invention to provide a method of writing to duplicate the representation of letters by making a reversal trace on the corresponding grid squares. It is a further object of the invention to provide a method of writing to speed up the writing process by using a combination of traces to represent syllables and short words, which is analogous to a form of shorthand writing. Finally, it is the object of the present invention to provide a method that allows the use of more than 370 mathematical symbols.

These and other objects are met by the present invention which will become more apparent from the accompanying drawings and the following detailed description of the drawings and preferred embodiments.

BRIEF DESCRIPTION OF THE SEVERAL VIEWS OF THE DRAWINGS

FIG. 1 shows the Latin alphabet using the Lineographic system of writing.

FIG. 2 shows the mathematical Greek alphabet using the Lineographic system of writing.

FIG. 3 shows the Russian alphabet using the Lineographic system of writing.

FIG. 4 shows the Old German alphabet using the Lineographic system of writing.

FIG. 5 shows the Turkish alphabet using the Lineographic system of writing.

FIG. 6 shows the Punctuation Marks using the Lineographic system of writing.

FIG. 7 shows the Typographic symbols using the Lineographic system of writing.

FIG. 8 shows the Basic Characters and Numbers in their cardinal and ordinal forms.

FIGS. 9A and 9B show the alphabet in Italic and Bold fonts.

FIGS. 10A and 10B show the Binary Operations symbols using the Lineographic system FIGS. 11A, 11B and 11C show the Binary Relation symbols using the Lineographic system.

FIGS. 12A and 12B show Arrow Symbols using the Lineographic system.

FIGS. 13A and 13B show Miscellaneous Symbols using the Lineographic system

FIG. 14 shows the Delimiters symbols using the Lineographic system.

FIG. 15 shows the Big Size Symbols using the Lineographic system.

FIG. 17 shows a table illustrating the formations of Combinations of two letters.

FIG. 18A shows the Keypad for people with normal vision.

FIG. 19 shows a general arrangement of the multipurpose keypad.

FIG. 20 shows a list of the combination of three letters for the English language.

FIG. 21 shows a list for the combination of three letters for the Spanish, German, French, Portuguese and Polish.

FIG. 22 shows a list of the combination of three letters for the Turkish, Hungarian, Finnish, Swedish, and Russian.

FIGS. 23A and 23B show lists of the combination of three letters for the Esperanto language.

DETAILED DESCRIPTION OF THE INVENTION

The present invention may be understood more readily by reference to the following detailed description taken in connection with the accompanying drawing figures, which form a part of this disclosure. It is understood that this invention is not limited to the specific devices, methods, conditions, or parameters described and/or shown herein, and that the terminology used herein is for purpose particular embodiments by way of example only and not intended to be limiting of the claimed invention. Any of all patents and other publication identified in this specification are incorporated by reference as though forth herein.

Figure 7:
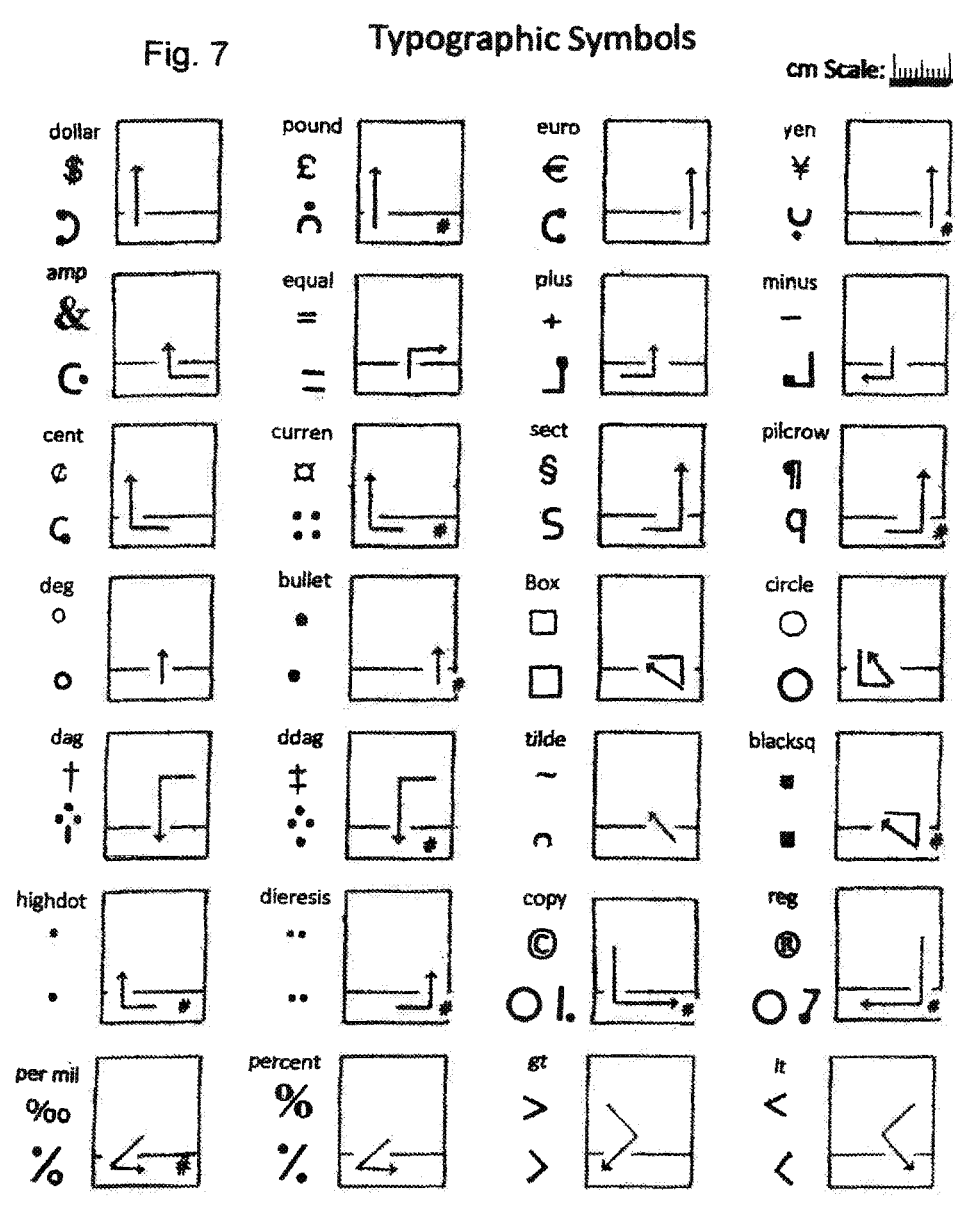

With reference now to the drawings, FIG. 1 depicts the Latin Alphabet according to the Lineographic system. FIG. 2 shows the Mathematical Greek Alphabet according to the Lineographic system, so, there is no confusion within the two alphabets. FIG. 3 shows the Russian Alphabet according to the Lineograhic system that includes some characters proper of this language. FIG. 4 shows the Old German Alphabet according to the Lineographic system that can be used in certain mathematical symbols and also as a complement in some complex languages such as the Chinese, Arabic, Vietnamese, Thai, Albanian, Japanese, Gaelic, Hungarian, Croatian, etc. FIG. 5 shows the Turkish Alphabet as an example of how the Latin Alphabet can be adapted to different alphabets without a major difficulty. Similar adaptations could be made by linguistics in different countries of the world. FIG. 6 shows the Punctuation Marks according to the more frequently used marks. The special accents are placed after the letter that is supposed to be accented. FIG. 7 shows the Typographic Symbols according to the Lineographic system. FIG. 8 shows the Basic Characters and the numbers in the cardinal and ordinal forms that can be entered using the Low and High case respectively. FIGS. 9A and 9B show the Latin alphabet in the Italic and Bold fonts that can be distinguished by a forward slant of 10° for the Italic font and 10° backwards for the Bold font.

Figure 10A:
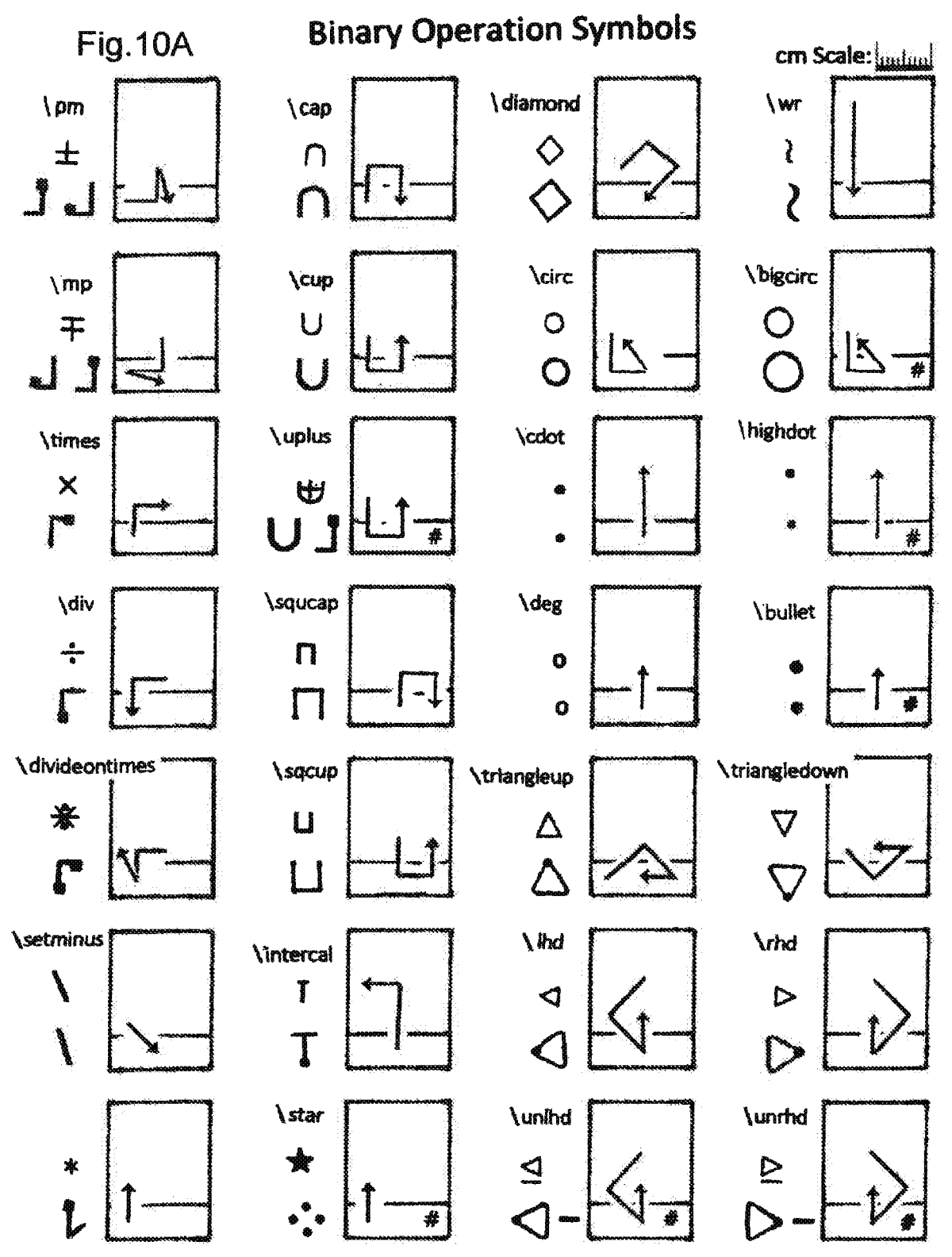
Figure 10B:
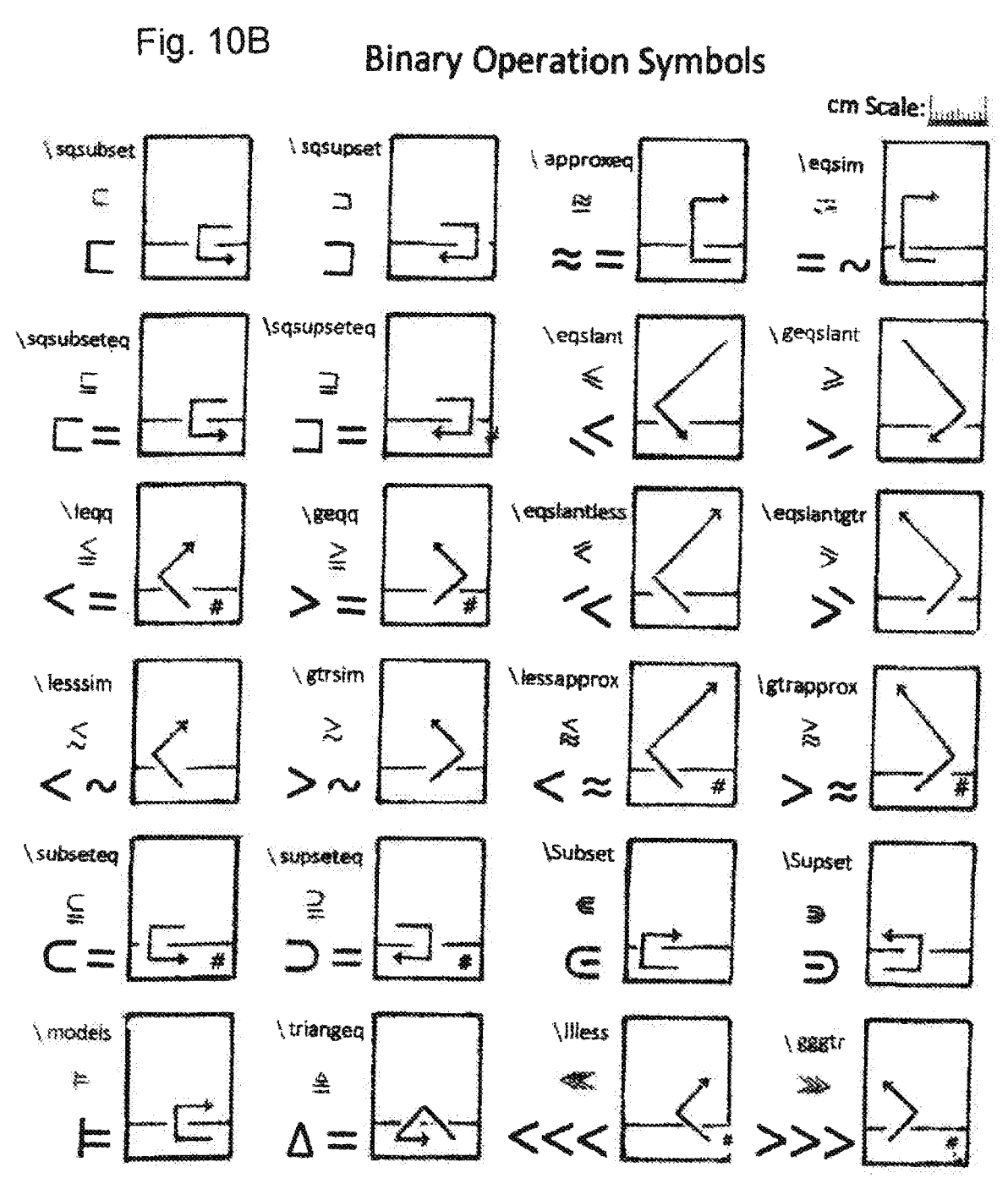
Figure 11B:
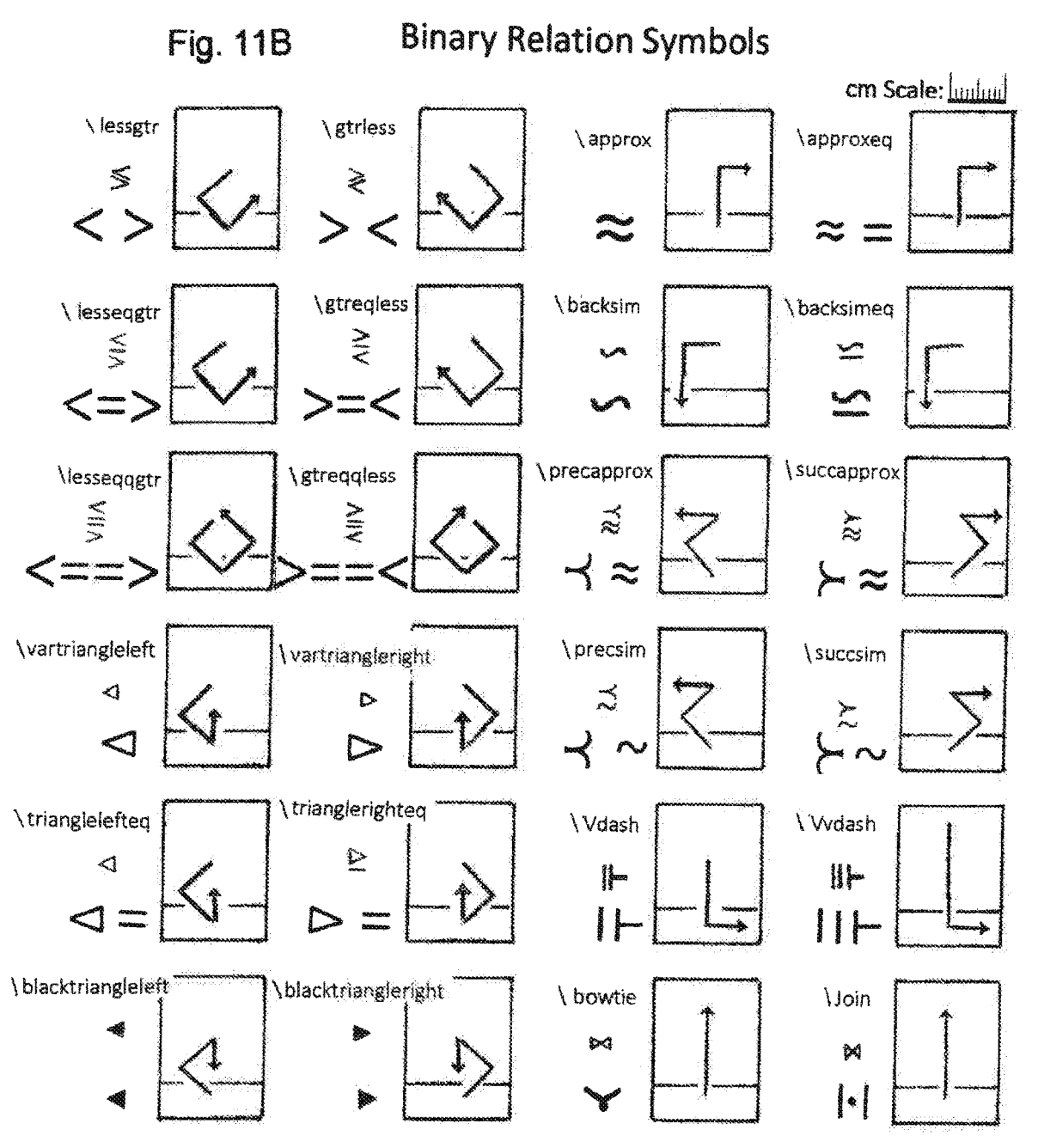
Figure 13A:
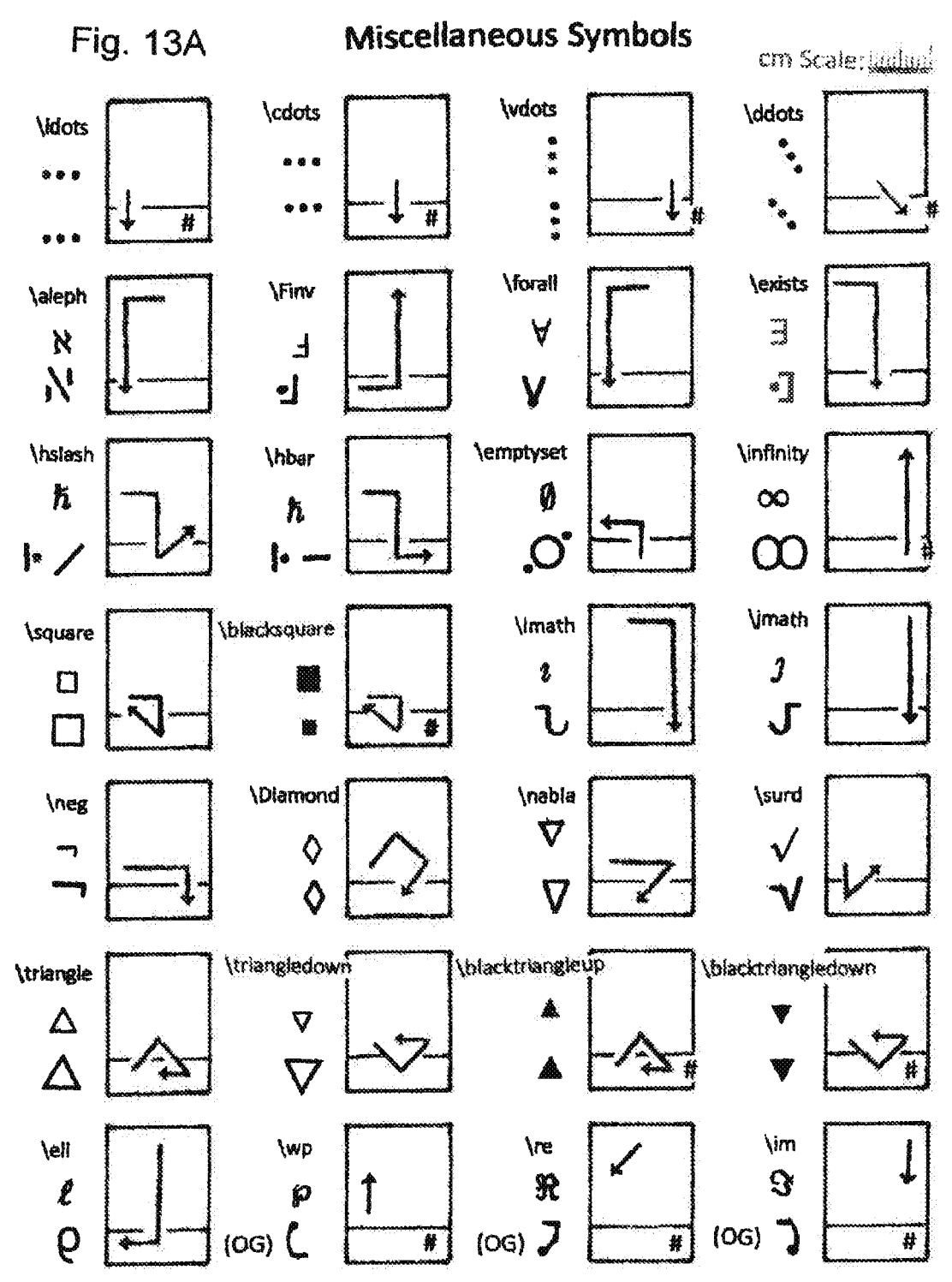
Figure 14:
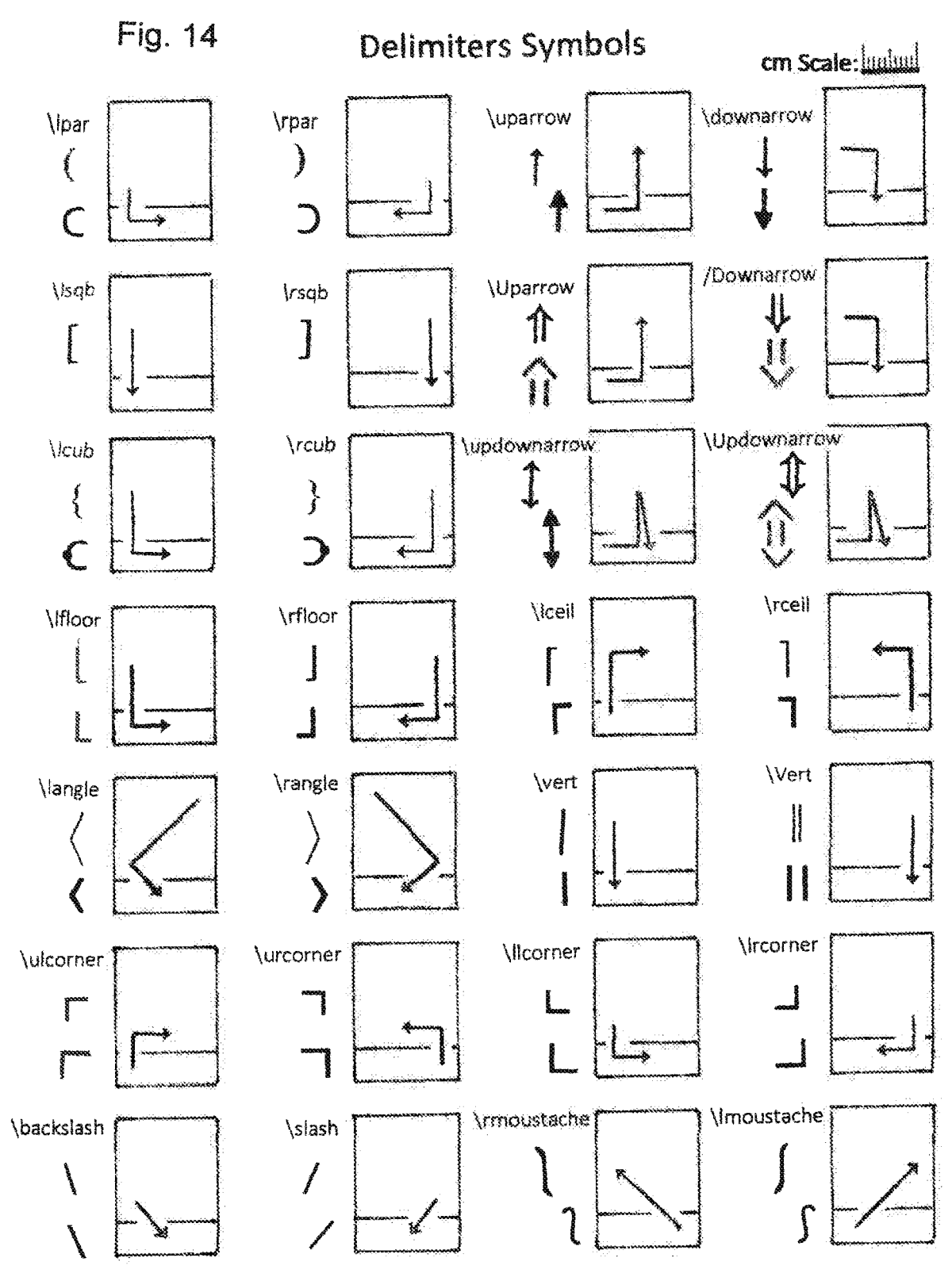
Figure 16:
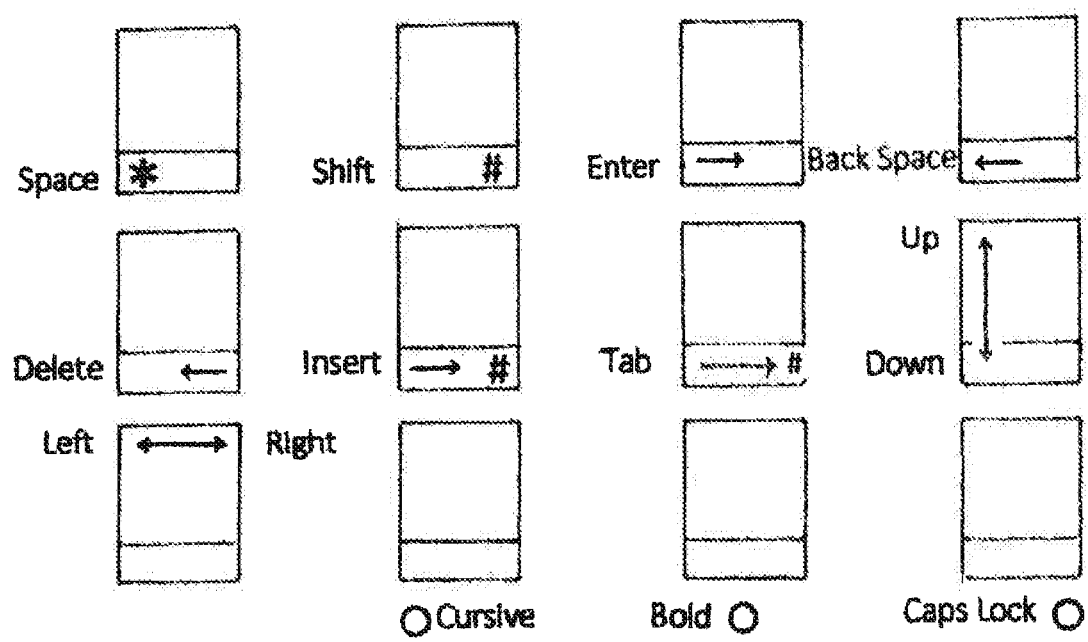
FIG. 16 shows the Command Keys for the multipurpose keypad.

The following figures show the mathematical symbols for people that are interested in this particular subject. FIGS. 10A and 10B show the Binary Operations symbols used in mathematical expressions according to the Lineographic system, FIGS. 11A, 11B and 11C show the binary Relation symbols used in mathematical expressions according to the Lineographic system. FIGS. 12A and 12B show the Arrows symbols used in mathematical expressions. FIGS. 13A and 13B show Miscellaneous Symbols generated by the Lineographic system. FIG. 14 shows the Delimiter symbols used in mathematical expressions. FIG. 15 shows the Big Size symbols used in mathematical expressions. FIG. 16 shows the Command Keys according to the Lineographic system. FIG. 17 shows a table with the Combination of Two Letters.

Figure 18B:
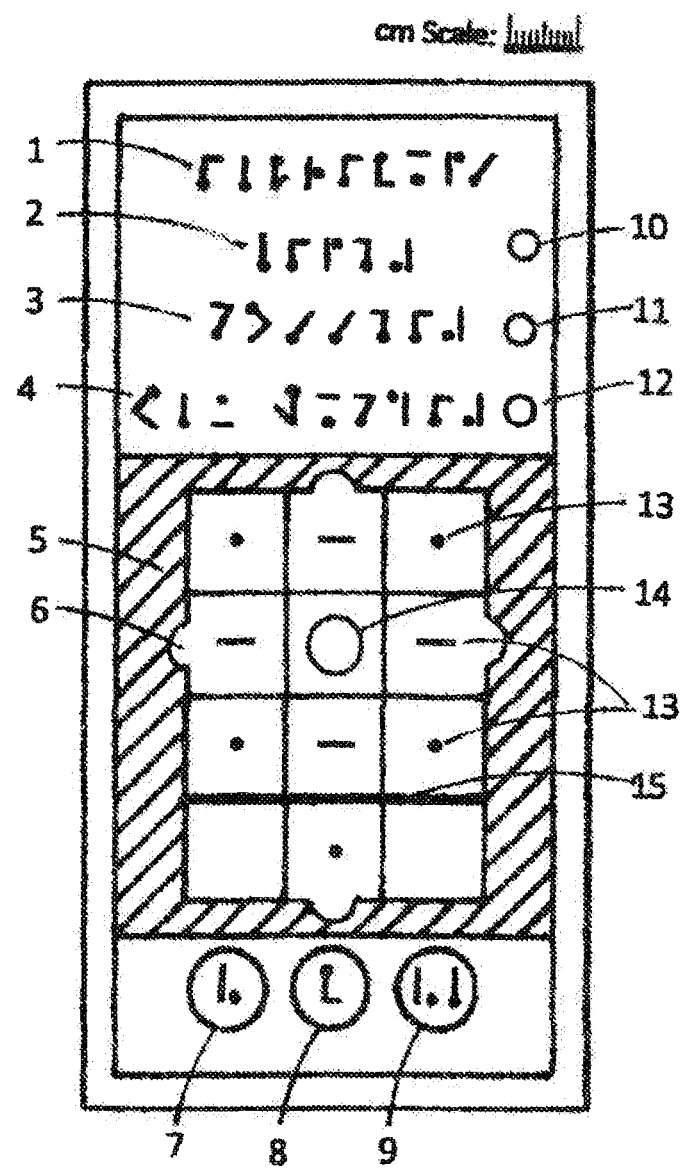
FIG. 18B shows the Modified Keypad for especially designed for the blind and visually impaired.

FIG. 18A shows a keypad generally referred as 10, that is like a regular telephone pad and is destined for people with normal vision. Electrical power is provided through a USB cable 12 for continuous use of keypad 10. This keypad is designed as a desktop device that can be connected to a personal computer or laptop (Not shown here) using a wireless keypad dongle compatible with the Microsoft Office system and connected to a Bluetooth adapter. In such a way the user can type any type of text materials that can be sent to a regular printer. Also, the blind and visually impaired can communicate each other through the web by using a special printer capable of printing embossed characters. In such a way this printer could print embossed glyphs of a new method of reading on regular bond paper (Not described here). In addition, the same computer can send messages to the regular printers used by the people with normal vision and, vice versa, a regular computer could send messages to the special printers containing the glyphs of the new method of reading. FIG. 18B shows an especially designed keypad in order to facilitate its use for the blind and the visually impaired. Said modified keypad can generate the glyphs in the alphabets 1 of different languages, including Latin 2, Russian 3, Old German 4 (or any other language) with their corresponding touch sensitive raised circles (10, 11, 12). It is provided with a raised frame 5 and guiding notches 6 and also with raised marks or protuberances (13 and 14) and a raised divisional line 15 to facilitate the location of the keys. Divisional line 15 divides the keys destined for the tetters only (Upper three rows), and the keys on the lower row that are associated with the command keys, punctuation marks, typographical and mathematical symbols. It is important to note that the only raised marks and lines on the keypad are the ones related to marks (13 and 14) and said divisional line 15. On the contrary, the lines forming the keypad grid are just painted. The raised circle 9 is the equivalent of the Capitals lock on the regular keypad. Raised circles 7 and 8 correspond to the Cursive and Bold fonts in such a way a way the blind and the visually impaired can communicate each other through the web by using a special printer (not described here but it could be constructed using the current software and hardware technology). This printer could print embossed glyphs on regular bond print paper. In addition, the same computer can send messages to regular printers used by people with regular vision. FIG. 19 shows the general arrangement of the multipurpose keypad composed by a personal computer 1, a Bluetooth adapter 2, a USB cable 3, a multipurpose keypad 4 and a wireless mouse 5.

FIG. 20 shows a list of the Combination of Three Letters for the English language. FIG. 21 shows a list of the Combination of Three Letters for the Spanish, German, French, Italian, Portuguese and Polish. FIG. 22 shows a list of the Combination of Three Letters for the Turkish, Hungarian, Finnish, Swedish, and Russian. FIGS. 23A and 23B show a list of the Combination of Three Letters for the Esperanto language.

I claim:

1. A multipurpose keypad for the use with an electronic device to facilitate communication for people with normal vision and for the blind and visually impaired, said keypad comprising:
    a section adapted to generate letters or glyphs simultaneously in different languages;
    an input section surrounded by a raised frame having a top edge, a bottom edge and opposing side edges, each edge defining a notch;
    said input section including a 4-row×3-column input grid defined by painted lines, except for the lower line which is raised;
    the upper three of said 4-rows dedicated to receiving input relating to alphabetic letters or glyphs destined to the blind or people with impaired vision;
    the bottom one of said 4-rows dedicated to input of commands, punctuation marks typographical and mathematical symbols; and
    a USB cable adapted to connect said keypad to an electronic device.

2. The keypad according to claim 1 further including 3 raised circles disposed above said upper edge configured to enable the selection of alphabets to be used.

3. The keypad according to claim 1 provided with 3 raised circles disposed below said bottom edge to receive user input.

4. The keypad according to claim 3 wherein the first one of said 3 raised circles corresponds to a Cursive font function.

5. The keypad according to claim 3 wherein the second one of said 3 raised circles corresponds to a Bold font function.

6. The keypad according to claim 3 where the third one of said 3 raised circles corresponds to a Capital lock function.

* * * * *